(12) United States Patent
Belson et al.

(10) Patent No.: US 7,555,665 B2
(45) Date of Patent: Jun. 30, 2009

(54) METHOD AND APPARATUS OF DISABLING CONVERTERS IN A POWER MODULE

(75) Inventors: Steve A. Belson, Plano, TX (US); Paul A. Wirtzberger, Greenville, TX (US); Terrel L. Morris, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 11/025,703

(22) Filed: Dec. 29, 2004

(65) Prior Publication Data

US 2006/0146504 A1   Jul. 6, 2006

(51) Int. Cl.
*G06F 1/26* (2006.01)
*H05K 7/10* (2006.01)

(52) U.S. Cl. .................... 713/330; 713/340; 710/302; 323/207

(58) Field of Classification Search ................ 713/330, 713/340; 323/207; 363/65, 34; 710/302
See application file for complete search history.

(56) References Cited

U.S. PATENT DOCUMENTS

| | | | |
|---|---|---|---|
| 5,003,453 A * | 3/1991 | Tighe et al. | ................... 363/65 |
| 5,550,729 A * | 8/1996 | Wissell | ......................... 363/65 |
| 5,737,202 A | 4/1998 | Shimamori | |
| 5,768,117 A | 6/1998 | Takahashi et al. | |
| 5,894,415 A | 4/1999 | Habegger | |
| 5,964,855 A * | 10/1999 | Bass et al. | ................... 710/302 |
| 6,771,052 B2 * | 8/2004 | Ostojic | ........................ 323/266 |
| 7,105,947 B1 * | 9/2006 | Marshall et al. | ................ 307/28 |
| 2002/0078290 A1 * | 6/2002 | Derrico et al. | ............... 710/302 |
| 2003/0156398 A1 | 8/2003 | Haden et al. | |
| 2004/0083196 A1 | 4/2004 | Reasor et al. | |
| 2004/0107383 A1 | 6/2004 | Bouchier et al. | |
| 2004/0143729 A1 | 7/2004 | Bouchier et al. | |
| 2004/0199832 A1 | 10/2004 | Powers et al. | |

FOREIGN PATENT DOCUMENTS

JP        2003263246 A   *   9/2003

* cited by examiner

*Primary Examiner*—Thuan N Du

(57) ABSTRACT

A power module includes a plurality of converters having outputs for coupling to a supply voltage. The power module further includes a connector having a pin to provide a signal indicative of whether the power module is being disconnected from a system. A controller is responsive to the signal indicating that the power module is being disconnected by sequentially deasserting enable signals to the converters to disable the converters in a sequential order.

25 Claims, 4 Drawing Sheets

METHOD AND APPARATUS OF DISABLING CONVERTERS IN A POWER MODULE

BACKGROUND

Power to various components of an electronic system (such as a computer system or other type of electronic system) is provided by a power supply in the electronic system. The power supply includes a power source that can be an alternating current (AC) source, such as that provided by a wall power outlet. The input of the AC power source is provided to an AC power adapter, which produces a direct current (DC) power voltage to the electronic system. Another type of power source is a battery, which provides one or more DC power voltages for the electronic system.

The power supply of an electronic system includes one or more DC-DC converters for converting an input DC voltage (such as that provided by a battery or by the AC power adapter) to one or more other power voltages that are provided to the components of the electronic system.

In some sophisticated electronic systems, such as high-end servers with multiple processors or processor modules, a power supply includes multiple power modules for redundancy. For example, an electronic system can include two power modules, each with its own set of converters and related circuitry. In a power supply with redundant power modules, if any one of the power modules fails, the remaining power module(s) can continue to supply power to the electronic system to enable continued operation of the electronic system.

If a power module should fail, then the power module containing the failed converter can be pulled out of the electronic system while the other power module(s) continues to supply power to the electronic system. The ability to replace power modules while the electronic system remains live is enabled by using hot-swappable power modules. A hot-swappable power module is a power module that can be removed from the electronic system while the electronic system remains powered on. Also, a hot-swappable power module can be inserted into the electronic system while the electronic system remains powered on.

During normal operation of an example electronic system having two identical power modules, each of the two power modules provides about half of the power to the load in the electronic system. As one or more converters start failing, then the remaining converters of both power modules compensate for the failed converter(s) by driving more power to the load. However, if one of the power modules has to be removed for replacement, then a sudden drop in the power supplied to the load will occur. Although the remaining power module of the electronic system can compensate for the removed power module, the remaining power module is typically unable to react fast enough to the sudden drop in supplied power. The sudden drop in the power supplied to the load as a result of the power module being removed can cause the output voltage provided by the remaining power module to dip before a full recovery can occur. The voltage dip can cause certain components in the electronic system to shut off, which may cause a crash of the electronic system. Low-voltage components, such as those that operate at 1.5 volts, for example, are especially susceptible to voltage dips caused by hot swapping of power modules.

If the electronic system is a server in a network environment, for example, a crash of the server due to the hot swapping of a power module would make the server at least temporarily unavailable. The temporary unavailability of the server means that data and services provided by the server would become inaccessible by users in the network environment.

DETAILED DESCRIPTION

Figure 1:
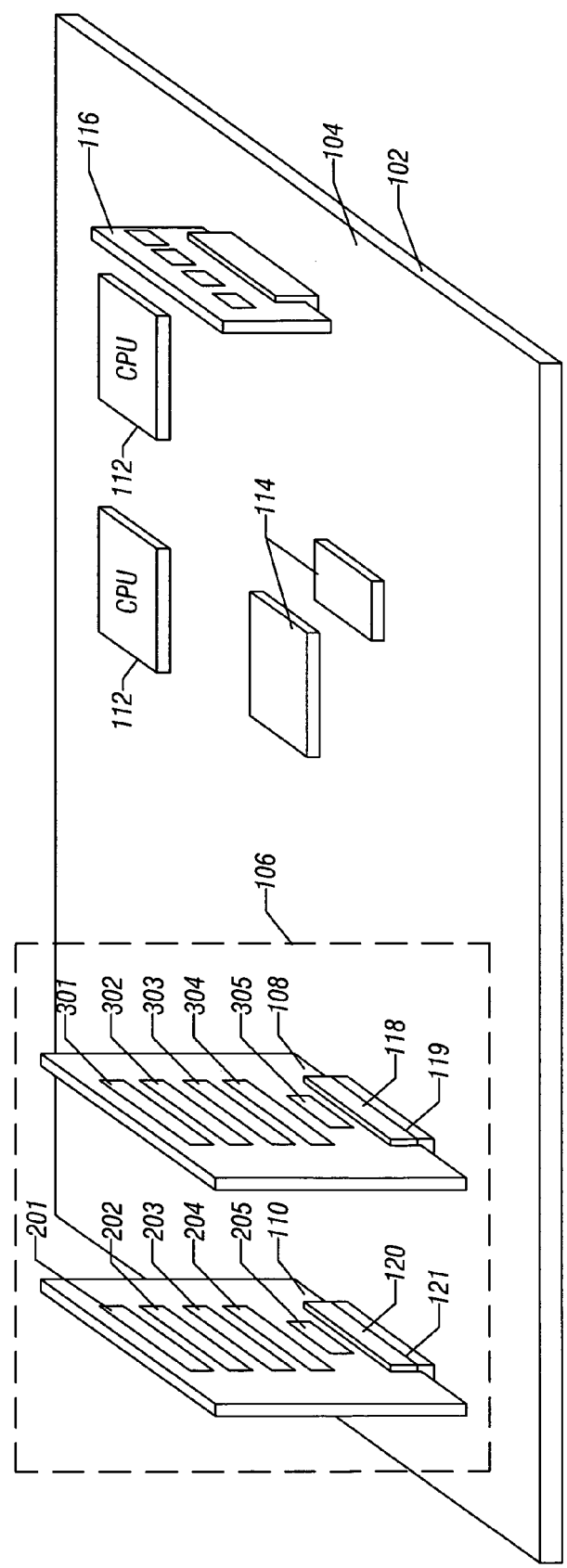
FIG. 1 illustrates a circuit board of a computer system that includes a power supply having power modules according to an embodiment of the invention.

FIG. 1 illustrates a portion of an electronic system that includes a circuit board 102 (referred to as a "system board"). Mounted on the system board 102 are central processing units (CPUs) 112, one or more memory modules 116, and various other electronic components 114. Although the system depicted in FIG. 1 includes two CPUs 112, other systems can include a smaller or larger number of CPUs. Also mounted on the circuit board 102 are components of a power supply 106. The power supply 106 includes redundant first and second power modules 108 and 110. Redundancy provided by the multiple power modules enables continued operation of the system in case of failure of one of the power modules 108, 110. In other embodiments, additional power modules can be provided in the power supply 106 for additional redundancy.

The power supply 106 also includes other components, such as an AC (alternating current) adapter, regulators, and so forth (not shown). Some of the components of the power supply 106 may be located off the system board 102. Although two power modules 108, 110 are depicted in FIG. 1, it is contemplated that other embodiments can employ a different number of power modules. The power modules 108, 110 have respective connectors 118, 120 for connection to respective connectors 119, 121 on the system board 102. The power modules 108 and 110 are hot-swappable power modules that can be removed or disconnected from the system board 102 while the system remains powered on and operational.

The power module 110 includes a plurality of converters (201, 202, 203, and 204 shown in FIG. 1). The power module 110 also includes a timing controller 205 to control the disabling of the converters 201-204. "Disabling" a converter refers to turning off the converter or otherwise stopping the converter from working.

The other power module 108 similarly includes four converters 301, 302, 303, 304 and a timing controller 305. The number of converters 201-204, 301-304 depicted in FIG. 1 are exemplary, as different numbers of converters can be employed in the power modules in other embodiments. Multiple converters 201-204, 301-304 are provided to increase the output current that can be driven by each power module. Also, the presence of multiple converters provides redundancy that enables continued operation of each power module despite failure of one or more converters. Each power module 108, 110 (according to an embodiment) is implemented as a circuit board on which the multiple converters and timing controller are mounted.

According to some embodiments, the converters 201-204, 301-304 are DC-DC (direct current-direct current) converters. A DC-DC converter is a device that receives an input DC voltage and produces at least one output DC voltage, typically at a different voltage level than the input voltage level. In a different embodiment, the converters 201-204, 301-304 can be AC-DC converters that are connected to accept an input AC voltage and to produce an output DC voltage.

Note that the arrangement of the computer system of FIG. 1 is provided as an example, as other arrangements of computer systems are possible in other embodiments. In one example implementation, the arrangement depicted in FIG. 1 is part of a cell of a computer server system that includes other like cells. In other implementations, the power modules 108, 110 can be provided in other types of electronic systems.

Figure 2:
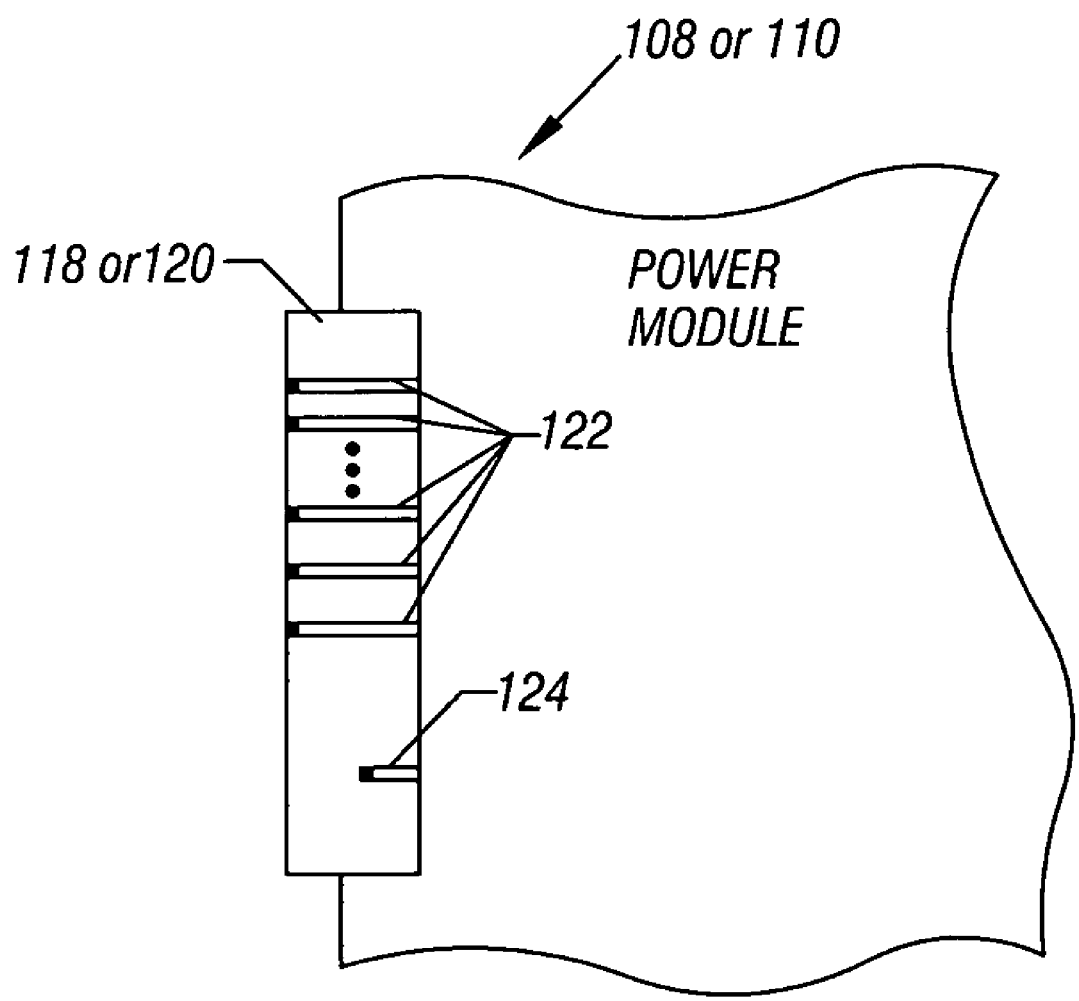
FIG. 2 illustrates a connector used with each of the power modules of FIG. 1, in accordance with an embodiment.

FIG. 2 illustrates pins that are employed in the connector 118 or 120 of the respective power module 108 or 110. The connector 118 or 120 includes multiple pins 122, 124. The pins 122 of the connector 118 or 120 have a first length, while the pin 124 has a second length that is shorter than the first length. The pins 122 communicate input and output power voltages as well as control, address, and/or data signals with components on the system board 102 and elsewhere in the electronic system. The short pin 124 provides a TRIGGER signal (shown in FIG. 3) that is used to detect when the power module 108 or 110 is being removed or disconnected from the system board 102 (while the system board 102 remains powered on).

As the power module 108 or 110 is being removed from the system board 102, the short pin 124 is the first to disengage from the mating connector 119 or 121 on the system board 102. The disengagement of the short pin 124 from the mating connector 119 or 121 causes the TRIGGER signal to change state, which provides an indication to the timing controller 205 or 305 in the respective power module 110 or 108 that the power module is being removed from the system board 102.

The timing controller 205 or 305, in response to detection of the removal of the power module from the system, then performs a sequential disabling of converters in the power module that is being removed. The sequential disabling of converters is performed in a specific time sequence, where some predefined time interval is provided between the disabling of successive converters. Disabling the converters one at a time in a sequential order allows the converters of the other power module(s) (the power module(s) remaining in the system) to gradually make up for the output current that was supposed to have been provided by the disabled converters. This avoids the situation where the remaining power module(s) has (have) to suddenly make up for the entire output current of the power module being removed.

In removing a power module from the system board 102, the amount of time between the point when the short pin 124 is disengaged and the point when the longer pins 122 are disconnected (which represents disconnection of the power module from the system board 102) is typically tens or hundreds of milliseconds or longer. On the other hand, the total time to sequentially disable all of the converters in the power module being removed can be some number of microseconds, according to some implementations. Thus, there is sufficient time for the orderly disabling of converters in the power module being removed to achieve a graceful transition of power output from the power module being removed to the remaining power module(s).

Figure 3:
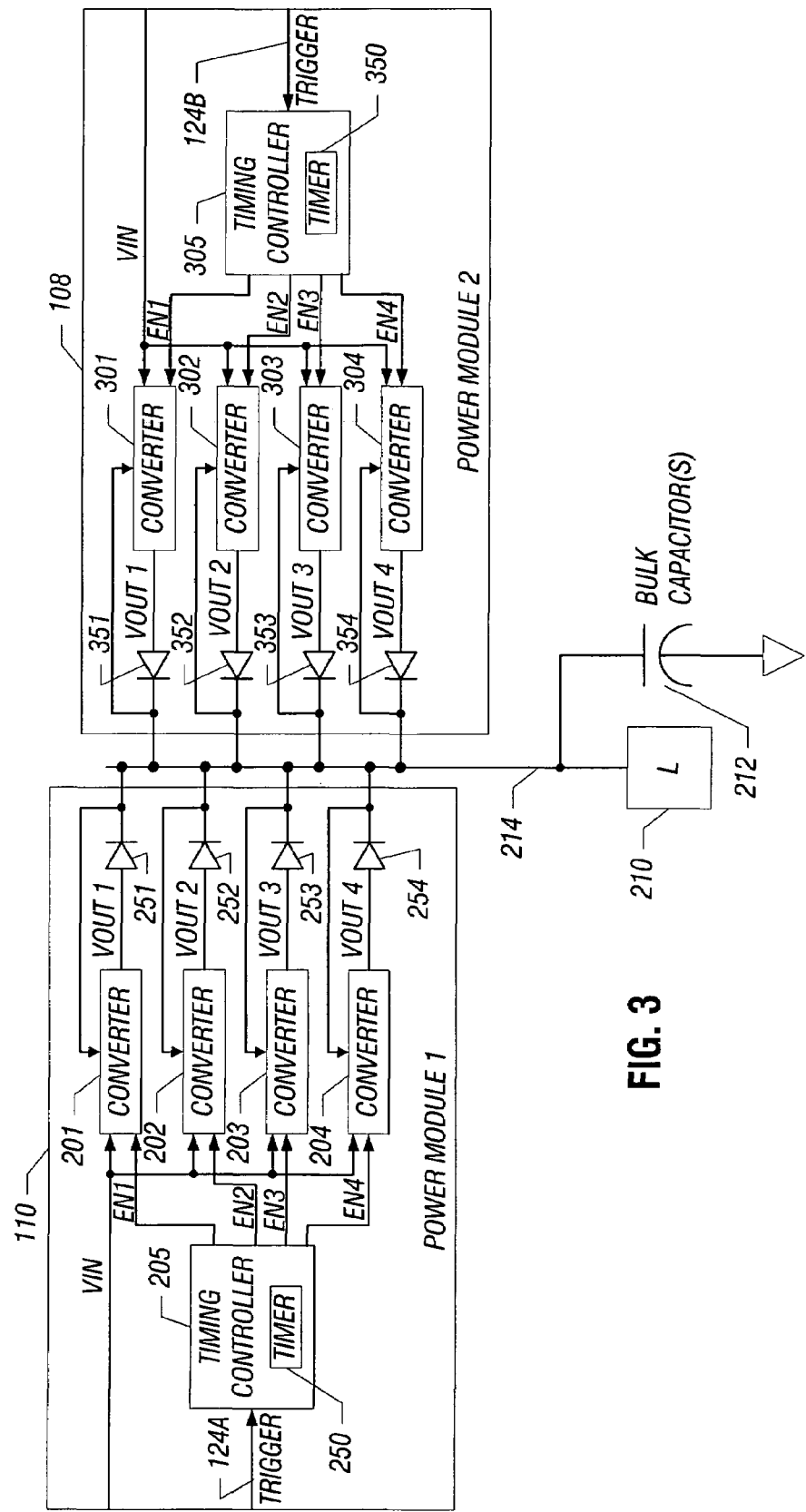
FIG. 3 is a block diagram of the power modules of FIG. 1, according to an embodiment.

As depicted further in FIG. 3, the power module 110 (designated "power module 1") has converters 201, 202, 203, and 204 that provide output voltages VOUT1, VOUT2, VOUT3, and VOUT4, respectively. The output voltages VOUT1, VOUT2, VOUT3, and VOUT4 are driven through respective diodes 251, 252, 253, and 254 to a power line 214. Note that the diodes 251-254 can actually be located inside respective converters 201-204. The power line 214 constitutes the power rail to drive at least some of the components of the system board 102, represented by a load 210. Instead of a single power line, the converters 201-204 and diodes 251-254 can drive multiple power lines that are part of a power bus.

One or more bulk capacitors 212 are connected to the power line 214. The bulk capacitors 212 are provided to remove high frequency noise on the power line 214, and also to temporarily provide charge to the power line 214 in case of variations in the output current supplied by power modules 108 and 110.

The converters 201, 202, 203, and 204 are enabled by respective enable signals EN1, EN2, EN3, and EN4 output by the timing controller 205. Assertion of an enable signal ENx (x=1, 2, 3, or 4) causes the respective converter $20x$ (x=1, 2, 3, or 4) to be enabled to drive the output voltage VOUTx (x=1, 2, 3, or 4) based on an input voltage VIN. The input voltage VIN is provided from a power source (such as from an AC power adapter or from a battery).

The timing controller 205 receives the TRIGGER signal from short pin 124 (labeled 124A for power module 110). The timing controller 205 includes a timer 250 that controls the relative timing of deasserting enable signals EN1, EN2, EN3, and EN4 to sequentially disable converters 201-204 in response to a change in the state of the TRIGGER signal due to removal of the power module 110.

The outputs of diodes 251-254 are provided in respective feedback paths to respective converters 201-204. The feedback from the output VOUTx enables each converter to adjust for variations in the respective output voltage VOUTx. The converter is able to selectively increase or decrease the output voltage VOUTx level in response to drops or surges in the output voltage.

The second power module 108 (designated "power module 2") includes identical components, including converters 301, 302, 303, 304 that drive respective output voltages VOUT1, VOUT2, VOUT3, and VOUT4 onto the power line 214 through respective diodes 351, 352, 353, and 354. The converters 301, 302, 303, and 304 are enabled by respective enable signal EN1, EN2, EN3, and EN4 from the timing controller 305. The timing controller 305 responds to a change in state of the TRIGGER signal received from short pin 124B in response to the power module 108 being removed from the system. A timer 350 in the timing controller 305 controls the timing of the sequential deassertion of the EN1, EN2, EN3, and EN4 signals in response to the TRIGGER signal changing state.

Figure 4:
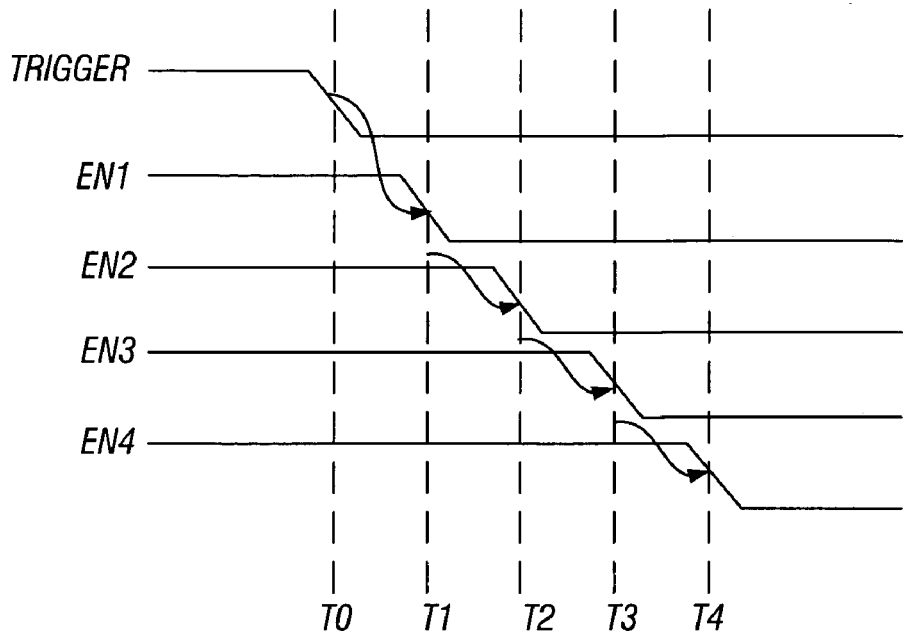
FIG. 4 is a timing diagram of signals associated with a timing controller in a power module of FIG. 3.

FIG. 4 shows a timing diagram that indicates the relationship between the TRIGGER signal and the enable signals EN1, EN2, EN3, and EN4. The TRIGGER signal is received by the timing controller 205, 305 and the EN1, EN2, EN3, and EN4 signals are output by the timing controller 205, 305. When the power module 108, 110 is connected to the system board 102, the TRIGGER signal remains asserted at a high state, which occurs prior to time T0. In response to removal of the power module 110 or 108 (and more specifically disengagement of the short pin 124), the TRIGGER signal is deasserted at time T0. Deassertion of the TRIGGER signal at time T0 causes the timer 250 or 350 in the timing controller 205 or 305 to start counting. After some predefined time interval from time T0, the enable signal EN1 is deasserted at time T1 to disable converter 201 or 301. After another predefined time interval, the enable signal EN2 is deasserted at time T2 to disable converter 202 or 302. Next, after another predefined time interval, the enable signal EN3 is disabled at time T3, followed by disabling of enable signal EN4 at time T4. Thus, as illustrated in FIG. 4, a sequential order of disabling converters in a power module is provided in which a time interval $T(x)-T(x-1)$ ($x=1, 2, 3,$ or $4$) is defined between disabling of any two successive converters. During the time period $T(x)-T(x-1)$, the remaining power module(s), the one(s) not being removed, can make up for the current output of the converter that has just been disabled.

The time period T4-T0 is smaller than the amount of time between disengagement of the short pin 124 and disengagement of the longer pins 122. As noted above, this provides sufficient time for the stepped, but gradual, decrease of available driving current from the power module to be removed so that the remaining power module(s) is able to gracefully make up for the relatively gradual decrease of driving current.

Figure 5:
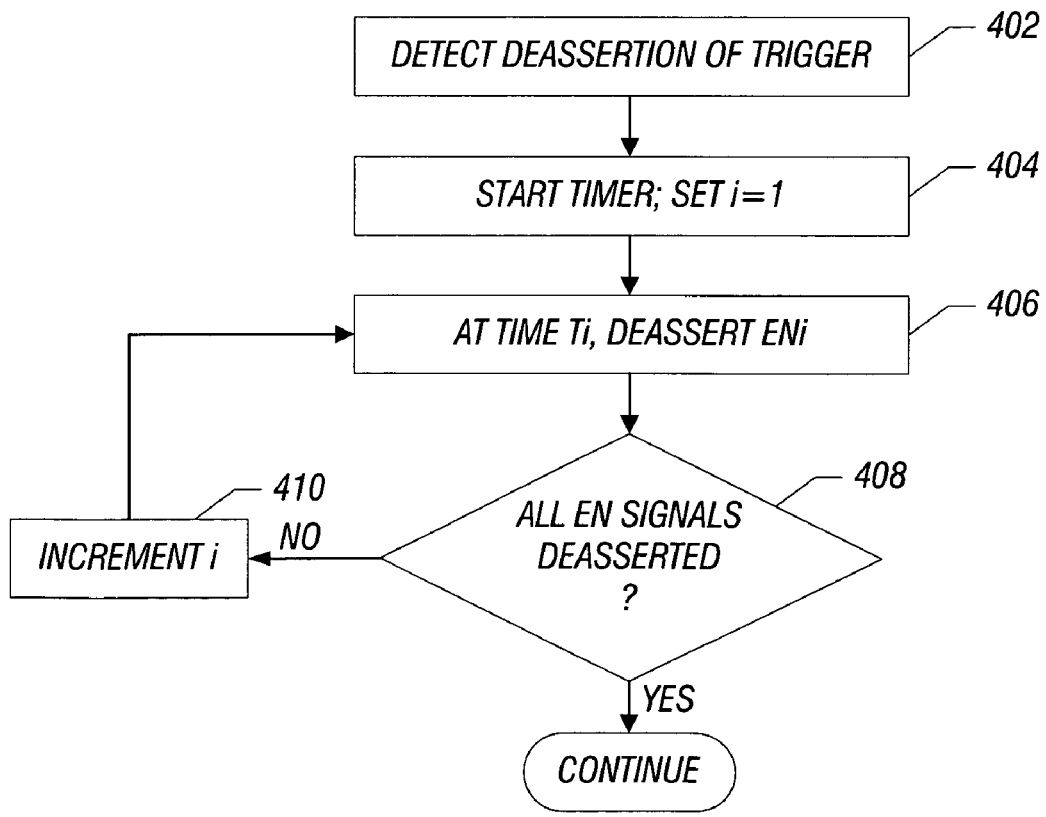
FIG. 5 is a flow diagram of a process performed by the timing controller of FIG. 4.

FIG. 5 is a flow diagram of a process performed by the timing controller 250, 350 according to an embodiment. The timing controller detects (at 402) deassertion of the TRIGGER signal. In response to deassertion of the TRIGGER signal, the timing controller starts (at 404) the timer 250, 350. A parameter i is initially set to the value 1. At time T1 (FIG. 4), which is some time interval after time T0 when the TRIGGER signal was deasserted, the enable signal EN1 is deasserted (at 406). The timing controller next checks to see if all EN signals have been deasserted (at 408). If not, the parameter i is incremented (at 410), and the timing controller deasserts ENi (at 406) at time Ti (after some time interval). The process repeats until all enable signals of the power module being removed have been deasserted, which indicates that all converters of the power module being removed has been disabled.

Each of the timing controllers 205, 305 in the power modules can be a programmable gate array (PGA), a microcontroller, a microprocessor, or any other type of control device. The logic of the timing controller can be implemented in firmware and/or hardware.

Alternatively, software can be loaded into the timing controller to perform the predefined tasks. The software can be in the form of instructions that are executable on a processing core of the timing controller 205, 305. Software can be stored in storage media associated with the timing controller, which can be storage media within the timing controller or storage media outside the timing controller that is accessible by the timing controller.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a first module containing a first set of converters to provide a supply voltage to a load;
   a second module containing a second set of converters to provide the supply voltage to the load; and
   a controller to:
   detect that the first module is being disconnected, and
   in response to detecting that the first module is being disconnected, disable the converters in the first set in a sequential order,
   wherein the second set of converters are to gradually increase power to the load as the converters in the first set are disabled in the sequential order.

2. The system of claim 1, wherein the first module further comprises a first circuit board, and the second module further comprises a second circuit board, the first set of converters mounted to the first circuit board, and the second set of converters mounted to the second circuit board.

3. The system of claim 2, wherein the first circuit board has a connector having a plurality of pins, at least one of the pins being a short pin that is shorter than the remaining of the plurality of pins,
   the controller to detect that the first module is being disconnected by detecting that the short pin has been disengaged.

4. The system of claim 3, wherein the controller is mounted on the first circuit board.

5. The system of claim 3, wherein the second circuit board has a second connector having a plurality of pins, at least one of the pins being a short pin that is shorter than the remaining of the plurality of pins of the second connector.

6. The system of claim 5, further comprising a system board having mating connectors to connect to respective connectors of the first and second circuit boards.

7. The system of claim 6, wherein the first and second modules are hot-swappable.

8. The system of claim 1, wherein the controller is to disable the converters in the first set in the sequential order by:
   disabling a first converter in the first set; and
   a predetermined time period after disabling the first converter, disabling a second converter in the first set.

9. The system of claim 8, wherein the controller is to disable the converters in the first set in the sequential order by further:
   another predetermined time period after disabling the second converter, disabling a third converter in the first set.

10. The system of claim 1, further comprising a system board to which the first and second modules are mounted, and wherein the controller detects that the first module is being disconnected by detecting removal of the first module from the system board.

11. A system comprising:
   a first module containing a first set of converters to provide a supply voltage to a load;
   a second module containing a second set of converters to provide the supply voltage to the load; and
   a controller to:
   detect that the first module is being disconnected, and
   in response to detecting that the first module is being disconnected, disable the converters in the first set in a sequential order,
   wherein the first module further comprises a first circuit board, and the second module further comprises a second circuit board, the first set of converters mounted to the first circuit board, and the second set of converters mounted to the second circuit board,
   wherein the first circuit board has a connector having a plurality of pins, at least one of the pins being a short pin that is shorter than the remaining of the plurality of pins,
   the controller to detect that the first module is being disconnected by detecting that the short pin has been disengaged,
   wherein the controller is to disable the converters in the sequential order within a time period that is smaller than an amount of time involved in disconnecting the first module.

12. A method of providing a supply voltage to a load in a system, comprising:
- connecting a first module having plural converters to the supply voltage;
- connecting a second module having plural converters to the supply voltage;
- detecting that the first module is being removed from the system; and
- in response to detecting that the first module is being removed, sequentially disabling the converters of the first module, wherein time intervals are defined between successive disabling of converters of the first module,
- wherein the converters of the second module are to gradually increase power to the load as the converters of the second module are disabled sequentially.

13. The method of claim 12, wherein sequentially disabling the converters of the first module comprises:
- disabling a first converter of the first module in response to detecting that the first module is being removed from the system; and
- a predetermined time period after disabling the first converter, disabling a second converter of the first module.

14. The method of claim 13, wherein sequentially disabling the converters of the first module further comprises:
- another predetermined time period after disabling the second converter, disabling a third converter of the first module.

15. The method of claim 12, wherein the first module has a connector including a plurality of pins, at least one of the plurality of pins being a short pin that is shorter than the remaining of the plurality of pins, wherein detecting that the first module is being removed is performed by detecting disengagement of the short pin.

16. The method of claim 12, wherein the system comprises a system board, and wherein detecting that the first module is being removed from the system comprises detecting that the first module is being removed from the system board.

17. A method of providing a supply voltage to a load in a system, comprising:
- connecting a first module having plural converters to the supply voltage;
- connecting a second module having at least one converter to the supply voltage;
- detecting that the first module is being removed from the system; and
- in response to detecting that the first module is being removed, sequentially disabling the converters of the first module, wherein time intervals are defined between successive disabling of converters of the first module,
- wherein the first module has a connector including a plurality of pins, at least one of the plurality of pins being a short pin that is shorter than the remaining of the plurality of pins,
- wherein detecting that the first module is being removed is performed by detecting disengagement of the short pin,
- wherein the short pin is disengaged prior to disengagement of the remaining of the plurality of pins, wherein sequentially disabling the converters of the first module is performed within a time period that is smaller than an amount of time between disengagement of the short pin and disengagement of the remaining of the plurality of pins.

18. The method of claim 17, wherein detecting disengagement of the short pin comprises detecting disengagement of the short pin of the connector of the first module from a mating connector of a system board.

19. An article comprising at least one computer-readable storage medium containing instructions that when executed cause a controller to:
- detect that a first power module in a system is being removed, wherein the system includes a plurality of power modules, and wherein the first power module has a plurality of converters; and
- in response to detecting that the first power module is being removed, disabling the converters in a sequential order to provide a time interval between disabling of successive converters in the first power modules,
- wherein converters in a second of the power modules are to gradually increase power to a load as the converters in the first power module are disabled in sequential order.

20. The article of claim 19, wherein detecting removal of the first power module from the system comprises receiving a signal that has changed state in response to removal of the first power module from the system.

21. A power module comprising:
- a plurality of converters having outputs for coupling to a supply voltage;
- a connector having a pin to provide a signal indicative of whether the power module is being disconnected from a system; and
- a controller responsive to the signal indicating that the power module is being disconnected by sequentially deasserting enable signals to the converters to disable the converters in a sequential order,
- wherein the connector has a plurality of pins, wherein the pin providing the signal is shorter in length than the remaining of the plurality of pins,
- wherein the controller is to sequentially disable the converters of the power module within a time period that is smaller than a time for disconnecting the power module from the system.

22. A system comprising:
- a first module containing a first set of converters to provide a supply voltage to a load;
- a second module containing a second set of converters to provide the supply voltage to the load;
- means for detecting that the first module is being removed from the system; and
- means for sequentially disabling the converters of the first module in response to detecting that the first module is being removed, wherein time intervals are provided between successive disabling of converters of the first module,
- wherein the second set of converters are to gradually increase power to the load as the converters in the first module are disabled in the sequential order.

23. The system of claim 22, wherein the first module further comprises a first circuit board, and the second module further comprises a second circuit board, the first set of converters mounted to the first circuit board and the second set of converters mounted to the second circuit board.

24. The system of claim 23, wherein the first circuit board has a connector having a plurality of pins, at least one of the pins being a short pin that is shorter than the remaining of the plurality of pins,
- wherein the detecting means detects that the first module is being removed by detecting that the short pin has been disengaged.

25. A system comprising:
- a first module containing a first set of converters to provide a supply voltage to a load;
- a second module containing a second set of converters to provide the supply voltage to the load;

means for detecting that the first module is being removed from the system; and means for sequentially disabling the converters of the first module in response to detecting that the first module is being removed, wherein time intervals are provided between successive disabling of converters of the first module, wherein the first module further comprises a first circuit board, and the second module further comprises a second circuit board, the first set of converters mounted to the first circuit board, and the second set of converters mounted to the second circuit board, wherein the first circuit board has a connector having a plurality of pins, at least one of the pins being a short pin that is shorter than the remaining of the plurality of pins, wherein the detecting means detects that the first module is being removed by detecting that the short pin has been disengaged, wherein the disabling means sequentially disables the converters within a time period that is smaller than an amount of time involved in disconnecting the first module.

* * * * *

UNITED STATES PATENT AND TRADEMARK OFFICE
CERTIFICATE OF CORRECTION

PATENT NO. : 7,555,665 B2
APPLICATION NO. : 11/025703
DATED : June 30, 2009
INVENTOR(S) : Steve A. Belson et al.

It is certified that error appears in the above-identified patent and that said Letters Patent is hereby corrected as shown below:

In column 6, line 7, in Claim 2, delete "hoard," and insert -- board, --, therefor.

In column 8, line 11, in Claim 19, delete "modules," and insert -- module, --, therefor.

Signed and Sealed this

Twenty-fourth Day of November, 2009

David J. Kappos
*Director of the United States Patent and Trademark Office*